Aug. 14, 1923.
C. H. VOGEL
VEHICLE STEP
Filed Feb. 2, 1922
1,464,735
2 Sheets-Sheet 1
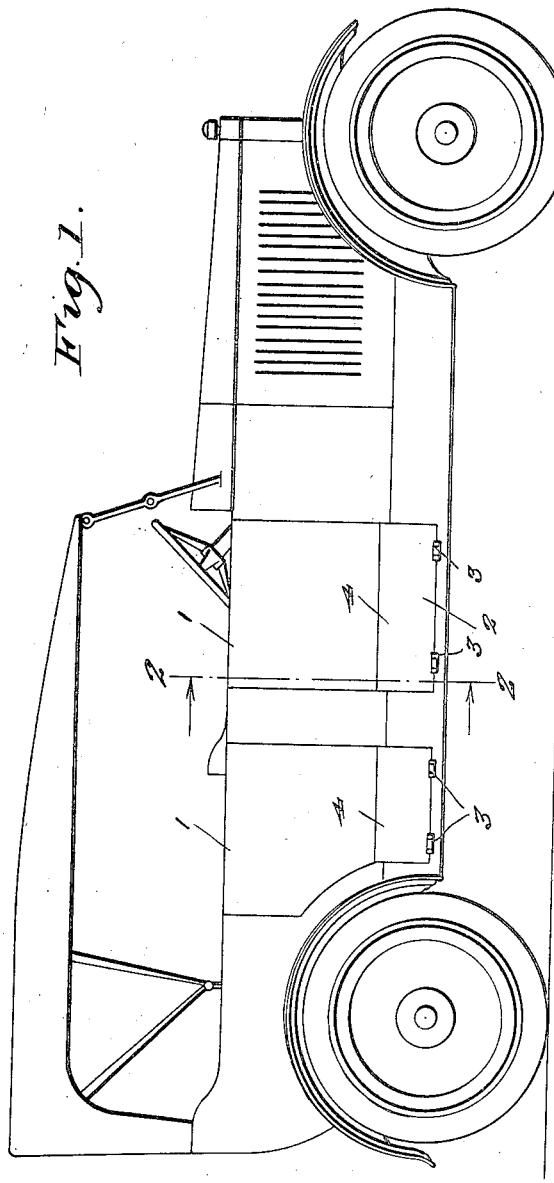
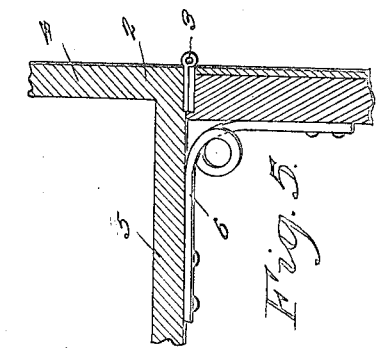
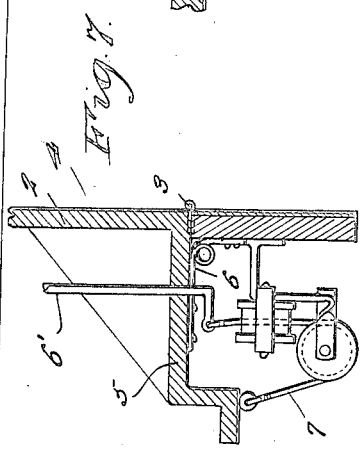
C. H. Vogel INVENTOR
BY *Victor J. Evans*
ATTORNEY
WITNESSES Aug. 14, 1923.
C. H. VOGEL
VEHICLE STEP
Filed Feb. 2, 1922  2 Sheets-Sheet 2
1,464,735
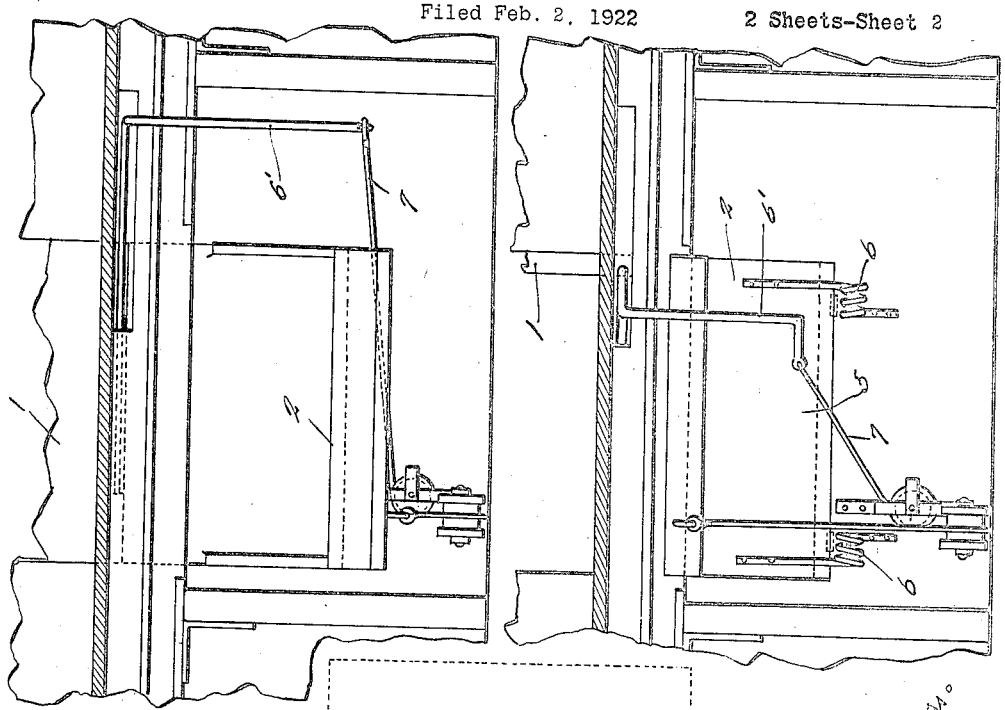
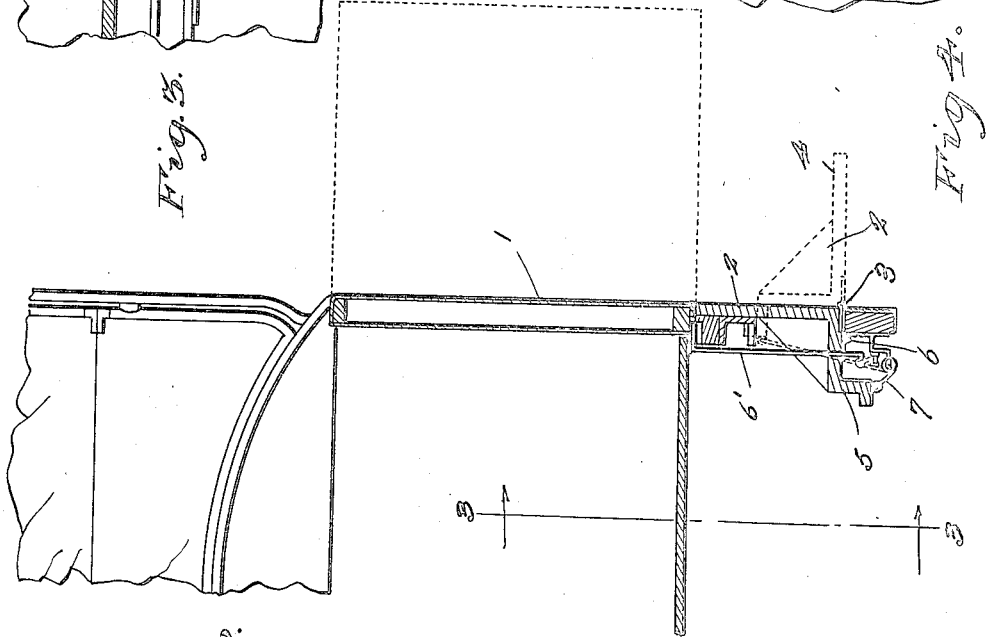
C. H. Vogel INVENTOR
BY Victor J. Evans ATTORNEY Patented Aug. 14, 1923.

1,464,735

UNITED STATES PATENT OFFICE.

CARL H. VOGEL, OF BUFFALO, NEW YORK.

VEHICLE STEP.

Application filed February 2, 1922. Serial No. 533,545.

*To all whom it may concern:*

Be it known that I, CARL H. VOGEL, a citizen of the United States, residing at Buffalo, in the county of Erie and State of New York, have invented new and useful Improvements in Vehicle Steps, of which the following is a specification.

This invention relates to a vehicle step, the general object of the invention being to provide a step which is swung to operative position when the door of the vehicle is opened and which is drawn to an inoperative position when the door is closed.

Another object of the invention is to provide simple and effective means for moving the step by the movement of the door.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side elevation of an automobile with the invention applied thereto.

Figure 2 is a section on line 2—2 of Figure 1.

Figure 3 is a sectional view taken on line 3—3 of Figure 2 looking in the direction of the arrows.

Figure 4 is a similar view with the door of the vehicle open.

Figure 5 is a detail sectional view showing the springs as applied to the step.

Figure 6 is a perspective view of the connecting lever.

Figure 7 is a detail sectional view showing the relative position of the pulleys.

In these views 1 indicates the door of the vehicle and 2 indicates the step which is of angle shape in cross section, as shown. The step is hinged to the body at the junction of its two parts, as shown at 3, and springs 6 to hold the step in operative position with the part 4 in a position where it projects from the body, below the door the same as an ordinary step, and the part 5 in upright position and forming a riser. A lever 6' has one end secured to the bottom edge of the door and to its opposite end a cable 7 is connected and the other end of the cable is connected with the part 5 of the step. This cable passes over pulleys 8 which are disposed at a right angle to each other as clearly shown in Figure 7 of the drawings, and are so arranged that when the door is swung to closed position the cable will be caused to move the step against the action of the spring to raise part 4 and lower part 5 so that part 4 takes place of the riser 5. When the door is opened the spring will return the step to open or operative position.

This invention will prevent persons from jumping on the running board or steps of an automobile as the step will be hidden until the door is opened.

While the invention is attached to an automobile it will of course be understood that it may be used on other vehicles.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a vehicle, a movable step therefor comprising a member which is angular in cross section, said member including a step part and a riser part respectively and being so designed to position the riser part in a vertical position and the step part in a horizontal position when the door is open, a lever having one end secured to the door and its opposite end bent and extended at a right angle from the door, a pair of pulleys right angularly disposed to each other, and a flexible element having one end connected to the bent and extended end of the lever thence trained under the pulleys and then being connected to the riser part to hold said riser part horizontally disposed and the step part vertically disposed when the door is closed.

In testimony whereof I affix my signature.

CARL H. VOGEL.